Jan. 20, 1931.   I. E. McELROY   1,789,905
PEDESTAL STRUCTURE FOR STANDARDS
Filed Jan. 10, 1929   2 Sheets-Sheet 1
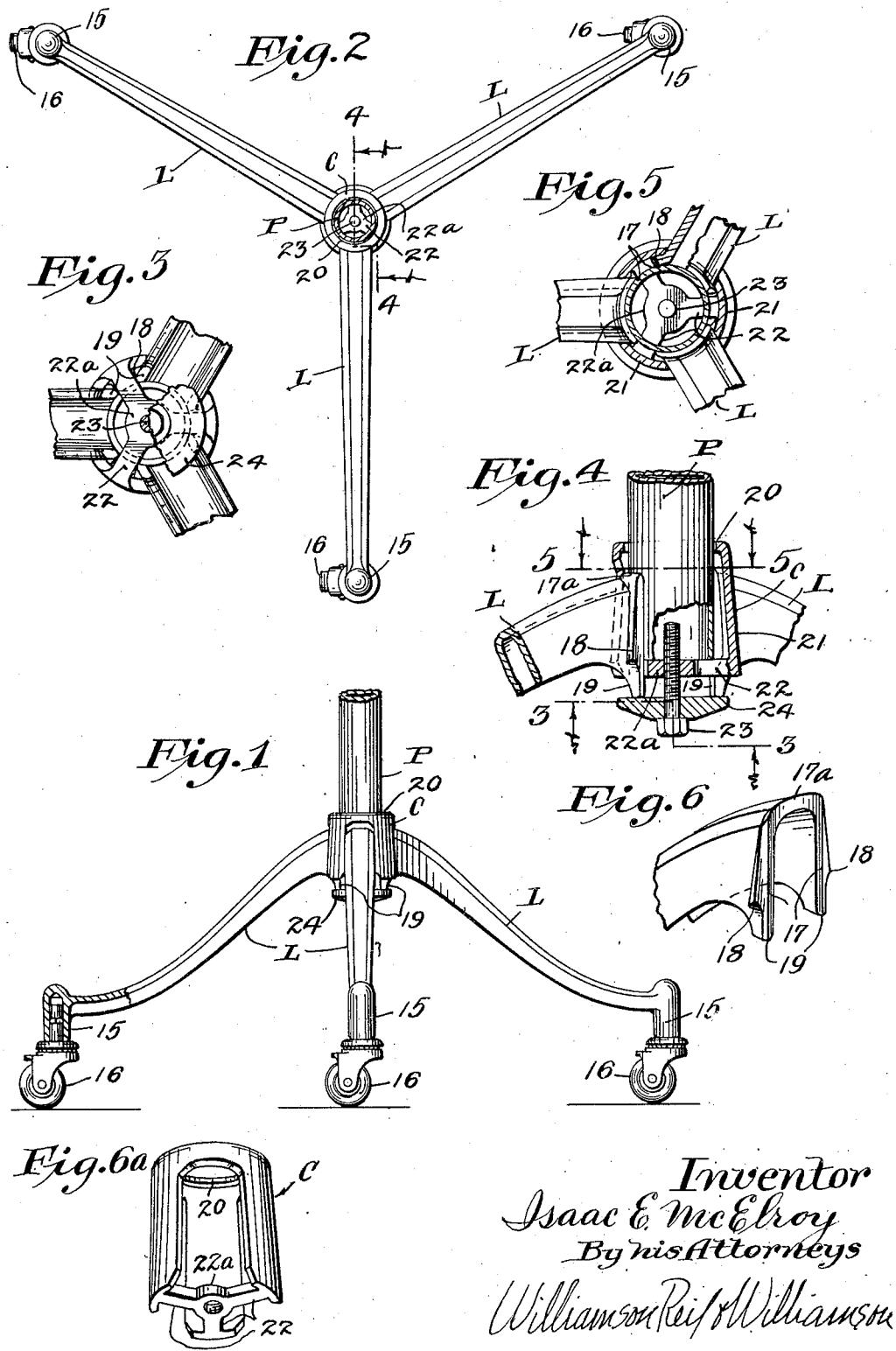
Inventor
Isaac E. McElroy
By his Attorneys
Williamson Reif & Williamson Jan. 20, 1931.                I. E. McELROY                1,789,905
PEDESTAL STRUCTURE FOR STANDARDS
Filed Jan. 10, 1929        2 Sheets-Sheet 2
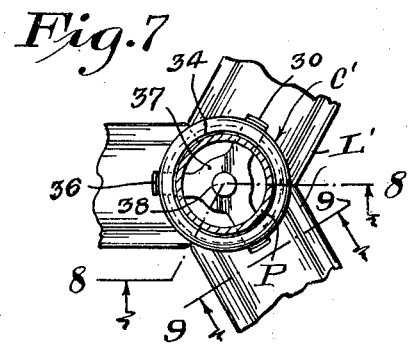
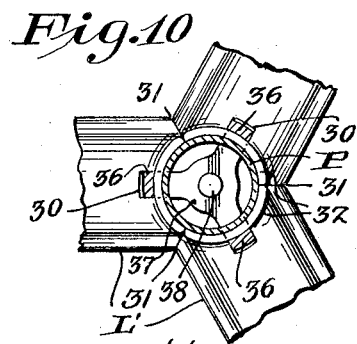
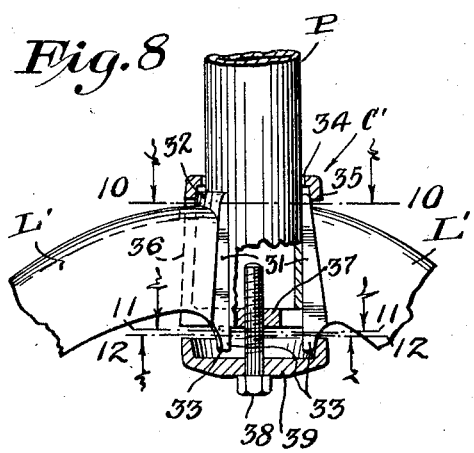
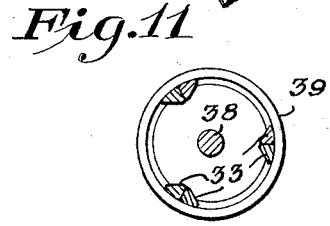
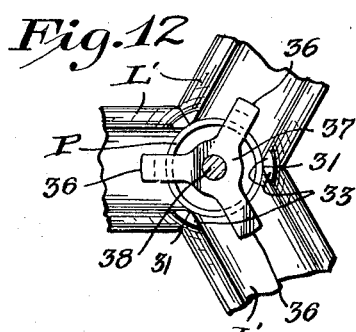
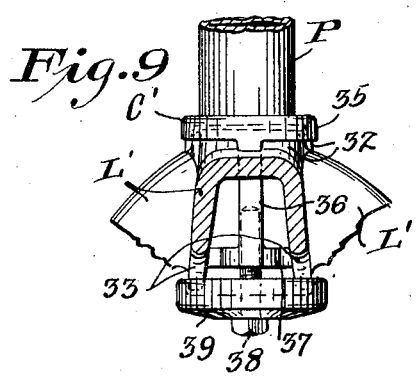
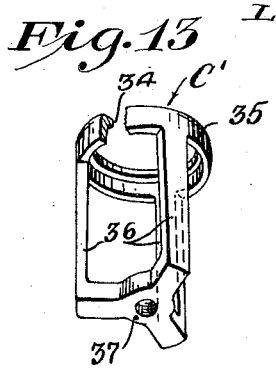
Inventor
Isaac E. McElroy
By his Attorneys
Williamson Reid & Williamson Patented Jan. 20, 1931

1,789,905

UNITED STATES PATENT OFFICE

ISAAC E. McELROY, OF MINNEAPOLIS, MINNESOTA

PEDESTAL STRUCTURE FOR STANDARDS

Application filed January 10, 1929. Serial No. 331,545.

This invention relates to standards for supporting various equipment, such as for example, lamps, permanent wave machines, hair driers, etc., and the invention particularly relates to the pedestal structure of such standards.

It is an object of my invention to provide a simple and efficient pedestal structure for upright standards, having a plurality of radially disposed supporting legs which may be easily detached for shipping purposes and which may be rigidly connected with a post of a standard to support the same.

More specifically it is an object of my invention to provide efficient pedestal structure for upright standards whereby a plurality of radially extending legs may be easily and rigidly secured to an end of a solid or tubular post without machining, threading, tapping or otherwise preparing the end of said post.

It is a further object to provide structure of the class described, wherein a cage and a plurality of supporting legs are employed, the inner ends of said supporting legs having a wedging action between said cage and the lower end of a post to rigidly secure said parts together.

These and other objects and advantages of the invention will be apparent from the following description made in connection with the accompanying drawings wherein like reference characters refer to similar parts throughout the several views, and in which, Fig. 1 is a side elevation of an embodiment of my invention;

Fig. 2 is a top plan view of the same;

Fig. 3 is a fragmentary bottom plan view with some portions of the legs and retaining disc broken away;

Fig. 4 is a vertical section taken on the line 4—4 of Fig. 2;

Fig. 5 is a cross section taken on the line 5—5 of Fig. 4;

Fig. 6 is a fragmentary perspective view of the inner or attachment end of one of the supporting legs;

Fig. 6A is a perspective view of the wedging cage detached;

Figs. 7 to 12, inclusive illustrate a somewhat different embodiment of my invention, especially adapted for use where it is desired to employ supporting legs of greater width than the diameter of the upright post;

Fig. 7 is a cross section through the post just above the pedestal structure;

Fig. 8 is a vertical section taken on the line 8—8 of Fig. 7;

Fig. 9 is a vertical section taken on the line 9—9 of Fig. 7;

Fig. 10 is a cross section taken on the line 10—10 of Fig. 8 showing the position of the upper wedge-shaped edges at the inner ends of the supporting legs;

Fig. 11 is a cross section taken on the line 11—11 of Fig. 8 showing the engagement of the retaining cap with the wedge-shaped detents at the bottom of the inner ends of the legs;

Fig. 12 is a cross section taken on the line 12—12 of Fig. 8, showing the lower edges of the legs and the cage in plan; and Fig. 13 is a perspective view of the cage detached.

Referring to the embodiment of the invention illustrated in Figs. 1 to 6 inclusive, an ordinary upright post P, illustrated of tubular construction, is shown supported in upright position by means of a plurality of radially extending and downwardly curved legs L. As shown, the legs are three in number and are each provided at their outer ends with small vertical sleeves 15 adapted to accommodate the shanks of suitable castor wheels 16. Each of the legs L has an elongated curved body of inverted U-shaped cross section terminating at its inner end in a somewhat enlarged attachment head. As best shown in Fig. 6, this attachment head has a pair of substantially straight vertical edges 17 and beveled wedging elements 18 extending from edges 17 and projecting outwardly at the sides of the legs. Wedging elements 18 taper from their lower to their upper ends. A pair of depending hammering points 19 are provided on each attachment head, as clearly shown in Fig. 6.

A wedging cage, designated as an entirety by the letter C, co-operates with the attachment ends of the several legs and the lower end of post P to rigidly and positively secure the several parts together. Cage C is of general truncated conical appearance having an open upper end 20 provided with a slightly inturned annular flange and a plurality of, as illustrated three, longitudinal side members 21. A spider 22 extends across the lower end of cage C comprising three radial arms preferably formed integral with the rest of the cage and connecting together the longitudinal sides 21.

A central boss 22a is formed in said spider having a threaded bore adapted to engage a clamping bolt 23, which carries at its lower end a retaining disc 24.

The open upper end of cage C is of such diameter as to slip over the lower end of post P and with post P inverted, the spider 22 may abut the lower end thereof. The attachment ends of the several legs are each then inserted between two of the longitudinal side members 21 of cage C, wedging elements 18 of each attachment head engaging beneath the edges of the appropriate longitudinal members 21 of the cage. The upper edge, indicated by the numeral 17a of each attachment head is concave to conform in shape to the circumference of post P. The hammering points 19 of each attachment head may be struck to force the wedging elements 18 inwardly and against the appropriate surfaces of cage C. The wedging of said elements causes the attachment heads of the legs to be forcibly thrust between the outer surface of post P and the inner surfaces of the cage, thus positively connecting the post with the cage and the supporting legs L. After the attachment heads of the legs are securely driven into place, clamping bolt 23 may be inserted in the threaded bore of boss 22a of the spider, forcing the retaining disc 24 against the hammering points 19 of the attachment heads.

From the foregoing description it will be seen that a strong, rigid pedestal structure has been provided comprising few parts and capable of being manufactured at a low cost. The cage and legs may be of cast metal construction and no machining, threading or tapping is necessary to put the parts in condition for use, save the drilling and threading of the spider boss 22a, and if desired the retaining disc 24 and bolt may be eliminated from the structure by wedging the attachment heads tightly enough against the post. It will be obvious that my construction heretofore described may be quickly knocked down for shipping purposes.

The embodiment of the invention illustrated in Figs. 7 to 12, inclusive, is somewhat different from the embodiment previously described, although of the same general principle. As stated, it is especially applicable where it is desired to utilize legs of greater width than the upright post. Legs L' are of the same general shape as the legs shown in the embodiment first described, being of inverted U-shaped cross section and having enlarged inner or attachment ends. An elongated slot 30 is formed through the upper horizontal portion of the inner end of each leg and each attachment head is provided with a pair of beveled substantially vertical side edges 31 to permit the legs to extend radially with respect to post P with the beveled surfaces of adjacent legs abutting, as clearly shown in Figs. 10 and 12. The attachment heads of the legs do not have vertically extending wedging elements positioned medially of their upper and lower ends, but have upwardly extending wedging lips 32 at their upper ends of arcuate shape to conform to the circumference of post P and depending wedging points 33 at their lower extremities corresponding to the hammering points 19 of the form first described.

A wedging cage is utilized of somewhat different construction than the cage in the embodiment first described. Said wedging cage, indicated as an entirety by the letter C' has an open upper end 34 to accommodate the circumference of post P and is provided with a downturned flange 35 adapted to surround and engage the upper wedging edges 32 of the several attachment heads. Cage C' further includes a plurality, as shown three, of circumferentially arranged longitudinal side members 36, each being adapted to interfit with the slotted portion 30 of one of the legs. A spider connects the lower ends of longitudinal elements 36 of the cage and has a central boss 37 provided with a threaded bore to receive a clamping bolt 38. Clamping bolt 38 carries a wedging cap 39, which is adapted to surround and engage the wedging points 33 at the lower ends of the attachment head.

With this form of the invention, it will be seen that the cage is first slipped over the lower end of post P. The legs are next interfitted with the longitudinal elements 36 of the cage, the upper wedging ends of the attachment heads of each leg being seated within the downturned wedging flange 35 of the cage and the bolt is then screwed into the boss 37 of the spider at the lower end of the cage forcing the cap 39 against the wedging points 33. After bolt 38 is tightened, it will be seen that both the upper and lower ends of the several attachment heads of the legs are clamped against the outer surface of post P by the wedging action of flange 35 and the cap 39 upon lips 32 and points 33 respectively.

It will, of course, be understood that various changes may be made in the form, details, arrangement and proportions of the parts without departing from the scope of applicant's invention.

What is claimed is:

1. Pedestal structure for standards having in combination an upright post, a cage having an open upper end adapted to surround said post, and a spider rigidly secured to the lower end thereof, wedging surfaces on inner edges of said cage and a plurality of supporting legs having inner attachment ends provided with wedging elements adapted to be interposed between the wedging surfaces of said cage and the exterior of said post, and means securable to said spider for engaging the lower portions of said attachment head and for forcing said wedging surfaces upwardly with respect to said cage.

2. Pedestal structure for standards having in combination an upright post, a cage having an open upper end adapted to be slipped over one end of said post and having a plurality of circumferentially arranged downwardly extending sides rigidly connected with said upper end spaced from said post and having wedging surfaces on their inner edges, spider rigidly connecting together the lower ends of said sides, and a plurality of supporting legs having inner attachment ends provided with wedging elements adapted to be forced between said wedging surfaces of said cage and the exterior of said post.

3. Pedestal structure for standards having in combination, an upright post, a cage surrounding the lower end of said post and having an upper annular end and circumferentially arranged side members rigidly attached to said upper end and extending downwardly longitudinally of said post, the inner faces of said side members being spaced from said post, and a plurality of supporting legs projecting laterally from said cage and having attachment ends provided with upwardly extending wedging elements positioned longitudinally of said post and adapted to be forced between said post and said inner faces of the side members of said cage.

4. Pedestal structure for standards having in combination, an upright post, a cage surrounding the lower end of said post and having an annular upper end, and a plurality of circumferentially arranged side members rigidly attached to said upper end and extending downwardly longitudinally of said post, the inner faces of said side members being spaced from said post, a plurality of supporting legs projecting laterally from said cage and having attachment heads provided with upwardly extending wedging elements disposed longitudinally of said post and adapted to be forced between said post and said inner faces of the side members of said cage, a spider rigidly connecting the lower ends of said side members and disposed below the lower end of said post, and clamping means below and threadedly engaging said spider adapted to engage the lower ends of said attachment heads to force said heads and wedging elements upwardly relative to said cage.

In testimony whereof I affix my signature.

ISAAC. E. McELROY.